(12) United States Patent
Maggenti et al.

(10) Patent No.: US 9,019,927 B2
(45) Date of Patent: *Apr. 28, 2015

(54) OPTIMIZATION OF THE PRESENCE INFORMATION REFRESH FOR A WIRELESS DEVICE

(71) Applicant: QUALCOMM Incorporated, San Diego, CA (US)

(72) Inventors: Mark A. Maggenti, San Diego, CA (US); Harleen K. Gill, San Diego, CA (US); Mohammed Ataur Rahman Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,145

(22) Filed: Aug. 9, 2013

(65) Prior Publication Data

US 2013/0322385 A1 Dec. 5, 2013

Related U.S. Application Data

(63) Continuation of application No. 12/781,461, filed on May 17, 2010, now Pat. No. 8,520,613.

(51) Int. Cl.
*H04W 4/00* (2009.01)
*H04W 72/04* (2009.01)
*H04L 29/08* (2006.01)

(52) U.S. Cl.
CPC ............. *H04W 72/048* (2013.01); *H04L 67/24* (2013.01)

(58) Field of Classification Search
USPC ............... 370/329, 233; 455/422.1, 449, 509; 375/256
See application file for complete search history.

(56) References Cited

U.S. PATENT DOCUMENTS

| | | | |
|---|---|---|---|
| 5,956,642 A * | 9/1999 | Larsson et al. ................. | 455/449 |
| 6,097,700 A | 8/2000 | Thornberg et al. | |
| 6,745,011 B1 * | 6/2004 | Hendrickson et al. ..... | 455/67.11 |
| 7,675,891 B2 * | 3/2010 | Lindoff et al. ................ | 370/338 |

(Continued)

FOREIGN PATENT DOCUMENTS

| | | |
|---|---|---|
| CN | 1852314 A | 10/2006 |
| CN | 101043463 A | 9/2007 |

(Continued)

OTHER PUBLICATIONS

European Search Report—EP13173283—Search Authority—Hague—Sep. 16, 2013.

(Continued)

*Primary Examiner* — Andrew Lai
*Assistant Examiner* — Andrew C Lee
(74) *Attorney, Agent, or Firm* — Raphael Freiwirth (57) ABSTRACT

The various embodiments include methods implemented by a first mobile device for updating presence information for a second mobile device stored in memory of the first mobile device when the first mobile device determines that a calculated update quantification exceeds a particular threshold value. In an embodiment, the first mobile device may select one channel from a plurality of available communication channels in response to determining that the update quantification exceeds a threshold value. In a further embodiment, the first mobile device may update the presence information of the second mobile device via that selected channel.

9 Claims, 7 Drawing Sheets

(56) References Cited

U.S. PATENT DOCUMENTS

| | | |
|---|---|---|
| 8,131,281 B1 | 3/2012 | Hildner et al. |
| 8,191,106 B2 * | 5/2012 | Choyi et al. .................. 726/1 |
| 8,520,613 B2 | 8/2013 | Maggenti et al. |
| 2004/0085931 A1 * | 5/2004 | Rezaiifar .................. 370/331 |
| 2006/0087973 A1 | 4/2006 | Huang |
| 2006/0117050 A1 | 6/2006 | John et al. |
| 2006/0205396 A1 | 9/2006 | Laroia et al. |
| 2006/0245408 A1 | 11/2006 | Lee et al. |
| 2007/0032194 A1 | 2/2007 | Griffin |
| 2007/0037595 A1 | 2/2007 | Shpak |
| 2007/0270163 A1 * | 11/2007 | Anupam et al. ........... 455/456.1 |
| 2007/0270166 A1 * | 11/2007 | Hampel et al. ............ 455/456.3 |
| 2007/0291859 A1 | 12/2007 | Maes |
| 2008/0155476 A1 | 6/2008 | Forbes et al. |
| 2008/0165679 A1 * | 7/2008 | Anderson et al. ............ 370/230 |
| 2008/0279161 A1 * | 11/2008 | Stirbu et al. .................. 370/338 |
| 2009/0069018 A1 * | 3/2009 | Babbar ........................ 455/445 |
| 2009/0147937 A1 * | 6/2009 | Sullhan et al. .......... 379/201.02 |
| 2009/0233595 A1 | 9/2009 | Harris et al. |
| 2010/0128701 A1 | 5/2010 | Nagaraja |
| 2011/0025842 A1 * | 2/2011 | King et al. .................... 348/135 |
| 2014/0113646 A1 | 4/2014 | Maggenti et al. |

FOREIGN PATENT DOCUMENTS

| | | |
|---|---|---|
| EP | 1713219 A1 | 10/2006 |
| EP | 2012553 A1 | 1/2009 |
| JP | 2006514795 A | 5/2006 |
| WO | 2004062299 A2 | 7/2004 |
| WO | 2005072494 A2 | 8/2005 |
| WO | 2006112381 A1 | 10/2006 |
| WO | 2007069992 A1 | 6/2007 |

OTHER PUBLICATIONS

Partial European Search Report—EP13173283—Search Authority—Hague—Jul. 25, 2013.
International Search Report and Written Opinion—PCT/US2011/035711, ISA/EPO—Oct. 20, 2011.
Partial International Search Report—PCT/US2011/035711, ISA/EPO—Aug. 30, 2011.

\* cited by examiner

OPTIMIZATION OF THE PRESENCE INFORMATION REFRESH FOR A WIRELESS DEVICE

RELATED APPLICATIONS

This application is a continuation of U.S. patent application Ser. No. 12/781,461, entitled "Optimization of the Presence Information Refresh for a Wireless Device" filed May 17, 2010, the entire contents of which are hereby incorporated by reference.

BACKGROUND

The present invention generally relates to wireless telecommunication systems. More particularly, the present invention relates to techniques for optimizing presence information refresh rates for wireless devices that utilize a wireless telecommunication network.

Presence information is one of the most important enabling data for mobile device multimedia services. In order to enable mobile instant messaging, group chat, media sharing, and other forms of communication, the mobile device user needs to have the presence information of his or her contacts and know the capabilities of his or her contact's mobile devices. There exist several different standardized methods for providing up-to-date presence information to a mobile device. However, the cost of updating presence information over commercial wireless network is quite significant in terms of over-the-air resources needed for request and transmission of this data. The overhead needed in the wireless telecommunication network is thus much higher than using a fixed network.

Given the high overhead requirements for presence information on a wireless communication network, techniques for optimizing the timing and conditions associated with a presence information update request are desirable. It is thus to such techniques that the present disclosure is primarily directed.

SUMMARY OF THE INVENTION

The various embodiments may include a method of updating presence information on a mobile device by calculating an update quantification based at least on one of a network setting, priority information associated with an application requesting presence information, a timestamp of presence information stored in the memory, a user priority, how the mobile device is being used, an access policy for an access network, information identifying bandwidth of a wireless channel, a time period between subsequent requests for presence information, and load information for a base transceiver station; comparing the update quantification to a threshold value; determining whether presence information for a second mobile device stored in a memory of the mobile device requires updating based at least in part on the comparison of the update quantification to the threshold value; selecting one channel from a plurality of available communication channels in response to determining that the presence information for the second mobile device stored in memory requires updating, wherein each communication channel of the plurality of available communication channels is associated with a different communication protocol; and updating the presence information for the second mobile device stored in the memory of the mobile device via the selected one channel.

Further embodiments may include a method of updating presence information on a mobile device by calculating an update quantification; comparing the update quantification to a threshold value; determining whether presence information for a second mobile device stored in a memory of the mobile device requires updating based at least in part on the comparison of the update quantification to the threshold value; selecting one channel from a plurality of available communication channels in response to determining that the presence information for the second mobile device stored in memory requires updating, wherein each communication channel of the plurality of available communication channels is associated with a different communication protocol; and updating the presence information for the second mobile device stored in the memory of the mobile device via the selected one channel. In an embodiment, selecting one channel from a plurality of available communication channels may include calculating data rate information for each of the plurality of available communication channels; generating scores for each of the plurality of available communication channels based on the data rate information; and selecting the one channel in the plurality of available communication channels based on the generated scores.

Further embodiments may include a method of updating presence information on a mobile device by calculating an update quantification; comparing the update quantification to a threshold value; determining whether presence information for a second mobile device stored in a memory of the mobile device requires updating based at least in part on the comparison of the update quantification to the threshold value; returning cached presence information in response to determining that the presence information for the second mobile device stored in the memory does not require updating; selecting one channel from a plurality of available communication channels in response to determining that the presence information for the second mobile device stored in memory requires updating, wherein each communication channel of the plurality of available communication channels is associated with a different communication protocol; and updating the presence information for the second mobile device stored in the memory of the mobile device via the selected one channel.

Further embodiments may include a mobile device that includes a memory, and a processor coupled to the memory, wherein the processor may be configured with processor-executable instructions to perform the operations of the methods described above.

Further embodiments may include a mobile device including means for performing the operations of the methods described above.

In further embodiments, a non-transitory processor-readable storage medium may have stored thereon processor-executable software instructions configured to cause a processor to perform the operations of the methods described above.

DETAILED DESCRIPTION

In this disclosure, the terms 'communication device,' 'wireless telephone,' 'wireless communications device,' 'handheld device,' 'wireless communication device,' 'handset,' 'access terminal,' 'mobile device,' and 'mobile station' are used interchangeably. The terms 'call' and 'communication' are also used interchangeably. The term 'exemplary' means that the disclosed element or embodiment is only an example, and does not indicate any preference of use. Further, like numerals refer to like elements throughout the several drawings, and the articles "a" and "the" include plural references, unless otherwise specified in the description. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The term circuitry used throughout the disclosure can include hardware components such as application specific integrated circuits, hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. Logical processor(s) can be configured by software instructions embodying logic operable to perform function(s) that are loaded from memory, e.g., RAM, ROM, firmware, etc. In exemplary embodiments, where circuitry includes a combination of hardware and software, an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is left to an implementer.

Figure 1:
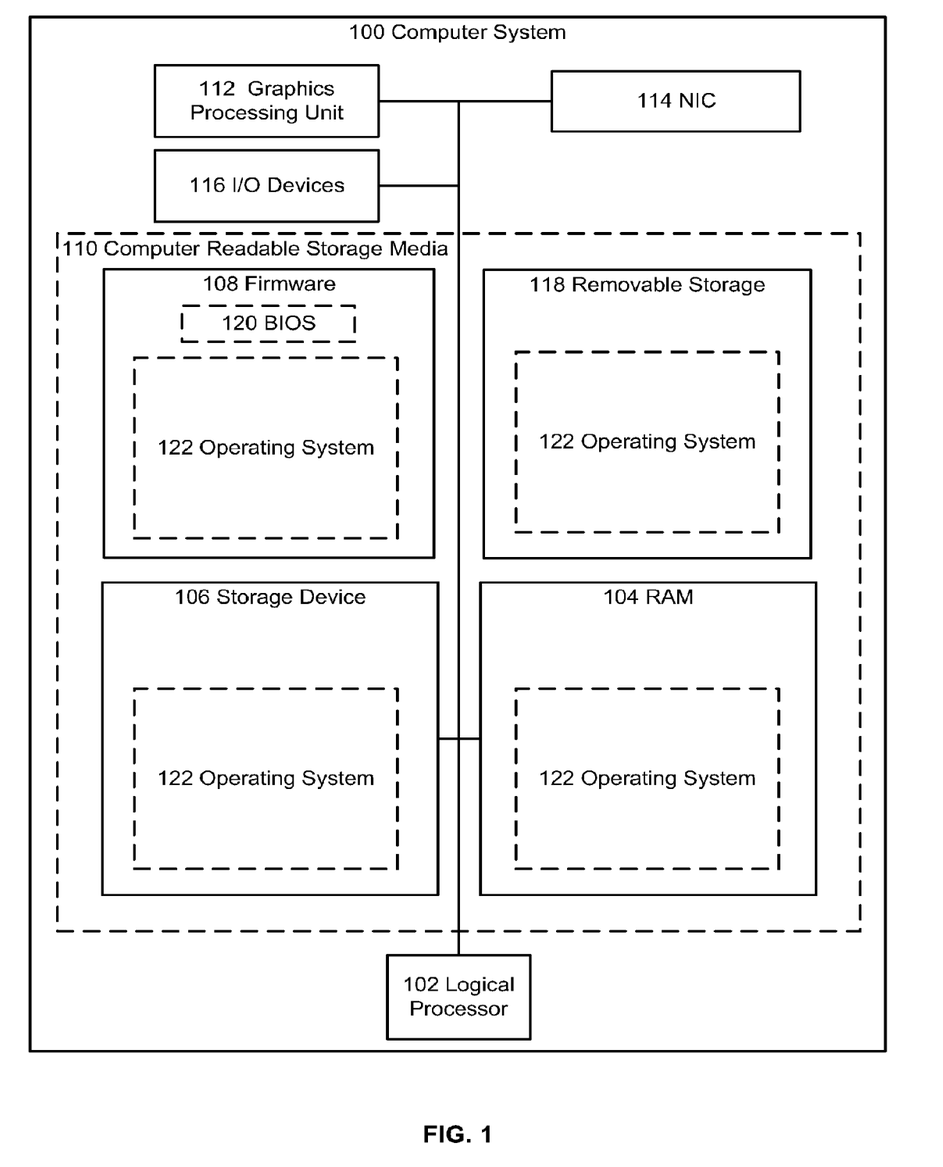
FIG. 1 describes an exemplary computer system.

Embodiments may execute on or use data stored on one or more computers. FIG. 1 and the following discussion are intended to provide a brief general description of a suitable computing environment in which the disclosure may be implemented. One skilled in the art can appreciate that computer systems disclosed herein can have some or all of the components described with respect to computer system 100 of FIG. 1.

Referring now to FIG. 1, an exemplary computer system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various non-transitory computer-readable storage media 110 can be interconnected by a system bus which couples various system components to the logical processor 102. The system bus may be any of several types of bus structures including a memory bus or memory controller, a peripheral bus, and a local bus using any of a variety of bus architectures. In exemplary embodiments the non-transitory computer-readable storage media 110 can include for example, random access memory (RAM) 104, storage device 106, e.g., a electromechanical hard drive, a solid state hard drive, etc., firmware 108, e.g., FLASH RAM or ROM, and removable storage 118 such as, for example, CD-ROMs, floppy disks, DVDs, FLASH drives, external storage devices, etc. It should be appreciated by those skilled in the art that other types of non-transitory computer-readable storage media can be used to store data, such as magnetic cassettes, flash memory cards, digital video disks, Bernoulli cartridges, etc.

The non-transitory computer-readable storage media 110 provides storage of non-transitory computer-readable instructions, data structures, program modules and other data for the computer 100. A basic input/output system (BIOS) 120, containing the basic routines that help to transfer information between elements within the computer system 100, such as during start up, can be stored in firmware 108. A number of applications and an operating system 122 may be stored on firmware 108, storage device 106, RAM 104, and/or removable storage devices 118, and executed by logical processor 102.

Commands and information may be received by computer 100 through input devices 116 which can include, but are not limited to, keyboards and pointing devices. Other input devices may include microphones, joysticks, game pads, scanners or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114 (NIC). The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
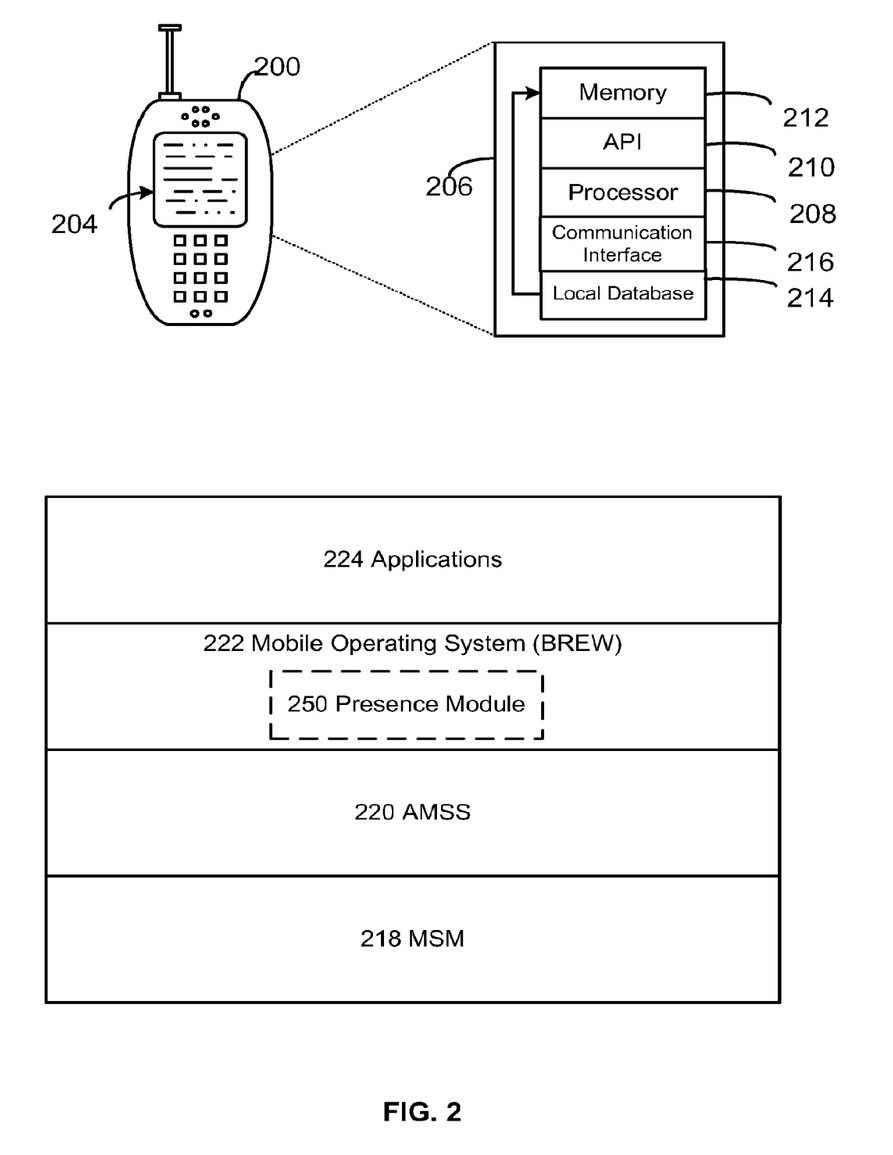
FIG. 2 depicts an exemplary mobile communication device.

Referring now to FIG. 2, it illustrates a mobile device 200 including a display 204. The mobile device 200 can include a computer platform 206 that can handle voice and data packets, execute software applications, and transmit information across a wireless network. The computer platform 206 includes, among other components, at least one processor 208 such as an application-specific integrated circuit ("ASIC") or a RISC processor such as those that implement the ARM architecture. The processor 208 is installed at the time of manufacture of the wireless communication device 200 and is not normally upgradeable. The processor 208 can execute an application programming interface ("API") layer 210, which can include an operating system which can control the hardware of the mobile device. An example of an operating system is the "binary runtime environment for wireless" (BREW) software developed by QUALCOMM® for wireless communication device platforms.

As shown here, the mobile device 200 can be a wireless communication telephone, but can also be any wireless device with a computer platform 206 as known in the art, such as a personal digital assistant (PDA), a pager with a graphics display, or even a separate computer platform 206 that has a wireless communication portal, and may otherwise have a wired connection to a network or the Internet. Memory, i.e., non-transitory computer-readable storage media, 212 can be comprised of read-only or random-access memory (RAM and ROM), EPROM, EEPROM, flash cards, or any memory common to computer platforms. The computer platform 206 can also include a local database 214 for storage of software applications not actively in memory 212. The local database 214 is typically comprised of one or more flash memory cells, but can be any secondary or tertiary storage device as known in the art, such as magnetic media, EPROM, EEPROM, optical media, tape, or soft or hard disk.

The computer platform 206 can also include a communication interface 216 that can be used to open a data channel to an endpoint such as a media server. The communication interface 216 can also be part of the standard communication interface for the mobile device 200 which ordinarily carries the voice and data transmitted to and from the wireless communication device 200. The communication interface 216 typically is comprised of hardware that is known in the art.

Continuing with the description of FIG. 2, additionally depicted is a diagram of software layers of that can execute on the processor 208. In an embodiment, computer platform 206 can include a series of software "layers" developed on top of the Mobile Station Modem (MSM) 218 and the Advanced Mobile Subscriber Software (AMSS) 220, developed by QUALCOMM®. In this example, the underlying MSM chipset can implement the software protocol stack for the entire suite of CDMA communication technologies that include CDMA2000 1X and CDMA2000 1xEV-DO. In this example, the AMSS 220 can be configured to support a mobile operating system layer 222, which in an embodiment is BREW®. The mobile operating system layer 222 can provide an application programming interface for chip or device-specific operations, while providing an isolation layer that eliminates direct contact to the AMSS 220 and any OEM software on the mobile device 200. The mobile operating system layer 222 can enable application development that uses wireless communication device features without having to rewrite the application each time a new release of the device-specific software is released.

In this example, the mobile operating system 222 is shown including presence module 250. Presence module 250 is shown in dashed lines which indicates that it is considered optionally located within the operating system, and the disclosure is not limited to the illustrated embodiment.

Continuing with the description of FIG. 2, it also shows that operating system 222 can support the execution of one or more applications 224 such as media clients, e.g., content players, instant messenger programs, push to talk applications, map applications, or any other application that uses presence information.

Figure 3:
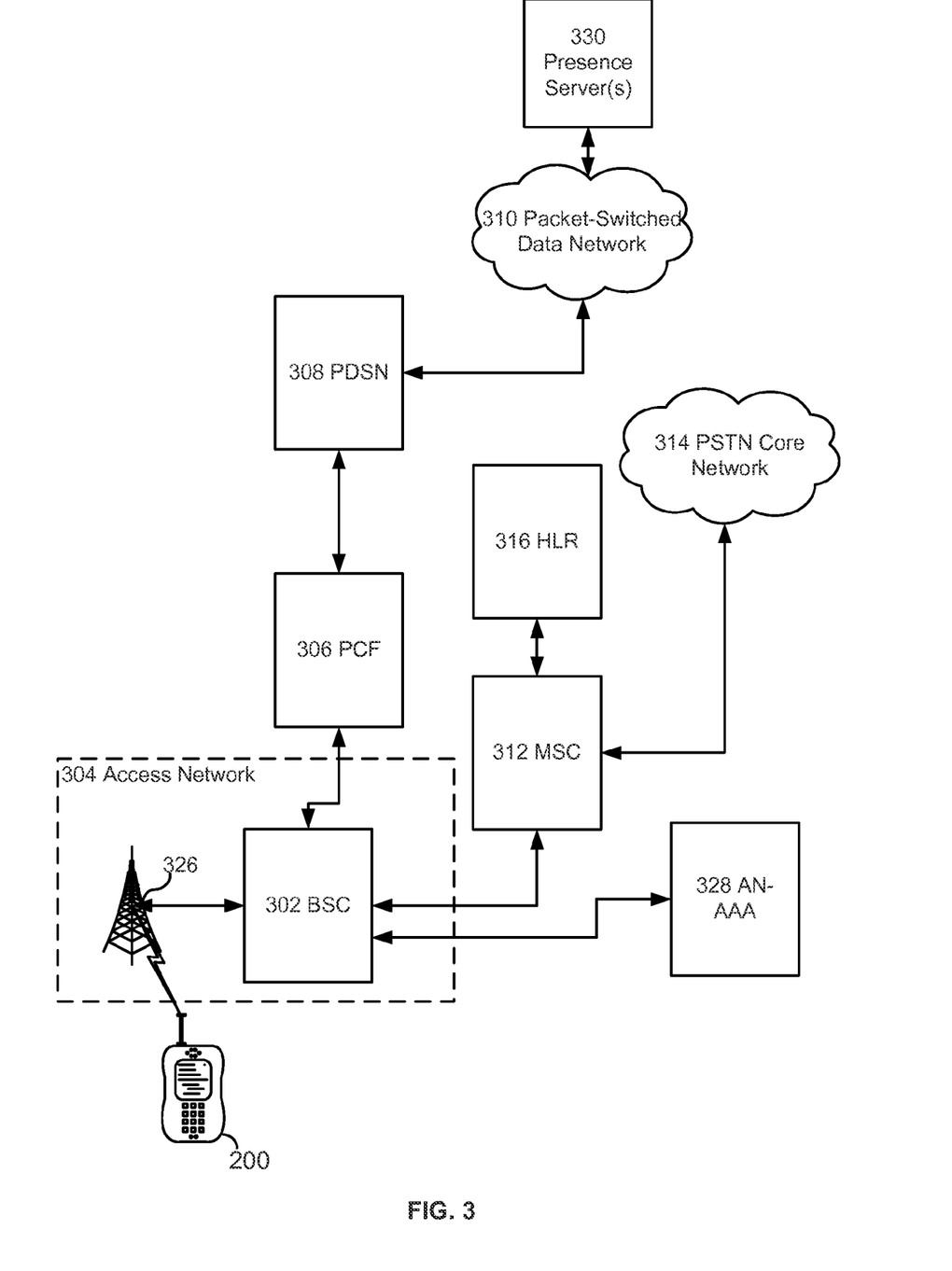
FIG. 3 shows an exemplary wireless network.

Turning to FIG. 3, an exemplary wireless network is illustrated. The wireless network is merely exemplary and can include any system whereby remote modules communicate over-the-air between and among each other and/or between and among components of a wireless network, including, without limitation, wireless network carriers and/or servers. As one of skill in the art can appreciate, each element can be effectuated by one or more computer systems including elements such as those described above with respect to FIG. 1. As illustrated by the figure, mobile device 200 (while one mobile device is shown one skilled in the art can appreciate that many more can simultaneously use the wireless network) can be in wireless communication with an access network 304 which can include base transceiver station 326 and base station controller 302. Access network 304 includes the equipment that provides data connectivity between a packet-switched data network and mobile devices over an air interface such as, for example, 1X-EV DO or the High rate packet data (HRPD) air interface.

For example, an HRPD system is like a CDMA system and uses spread spectrum and interference averaging to allow frequency reuse within a cell. In the forward link all physical channels are time multiplexed on a single composite channel whereas in the reverse link physical channels are code multiplexed and grouped as those used in the access mode or traffic channel mode. Reverse traffic channel mode includes a data channel which is used to carry user traffic from the mobile device to the base transceiver station.

Continuing with the description of FIG. 3, an access node authentication, authorization, and accounting server "AAA" 328 used to authenticate mobile devices can be coupled to a database operable to store information such as user accounts and privileges.

Data packets can be routed from the access network 304 to the packet data servicing node 308 (PDSN) via a packet controlled function 306 (PCF). PCF 306 is an element, e.g., one or more computer systems, that controls the transmission of packets between the access network 304 and the PDSN 308. The PCF 306 can be configured to keep track of registration and sessions, control available radio resources, buffer data received from the PDSN 308 until radio resources are available, etc. PDSN 308 includes equipment configured to provide data connectivity between a radio access network and a packet-switched data network 310 such as the Internet. Coupled to the packet-switched data network 310 is/are presence server(s) 330, which is/are configured to store presence information for a plurality of applications.

Presence information can include status indicators that convey the ability and willingness of a potential communication partner, location information, device capabilities, and the like. Common status indicators that indicate a user's willingness to communicate are "free for chat," "busy," "away," "do not disturb," and "out to lunch." Information that conveys the ability of the user to communicate can indicate whether the user is online or offline. In exemplary embodiments, device capabilities could include whether the device includes a push-to-talk application, can handle text messages, can handle streaming media, includes a camera, includes a music player application, or whether the user's service plan enables certain features.

Presence aware applications can obtain presence information from presence servers 330. For example, a presence aware application can be affiliated with one or more servers that store its presence information in a presence record called a "presentity." The presentity can be made available for distribution to other users to convey his or her presence information to compatible applications. A specific example could include a presence server that stores a user's online/offline status for a push to talk application. The presence server can make this online/offline status information available to other devices that run a compatible push to talk application. In this example, presence module 250 on a device could receive a request from a push to talk application for status information and presence module 250 can determine how to optimize use of the access network by, for example, determining whether to use a different access method to obtain presence information, delay the request until network conditions are favorable, and/or respond with cached presence information.

Voice packets can be routed to a mobile switching center 312 (MSC). The MSC 312 is the primary service delivery node responsible for handling voice calls and SMS as well as other services (such as conference calls, FAX and circuit switched data). Connected to the MSC 312 is a home location register 316 (HLR) and the public switched telephone network 314 (PSTN). The HLR 316 is the location register to which a user identity is assigned for record purposes such as subscriber information. The HLR 316 is the first database that is interrogated to obtain mobile location and routing information once a mobile device's number is dialed by a user outside the network.

Figure 4:
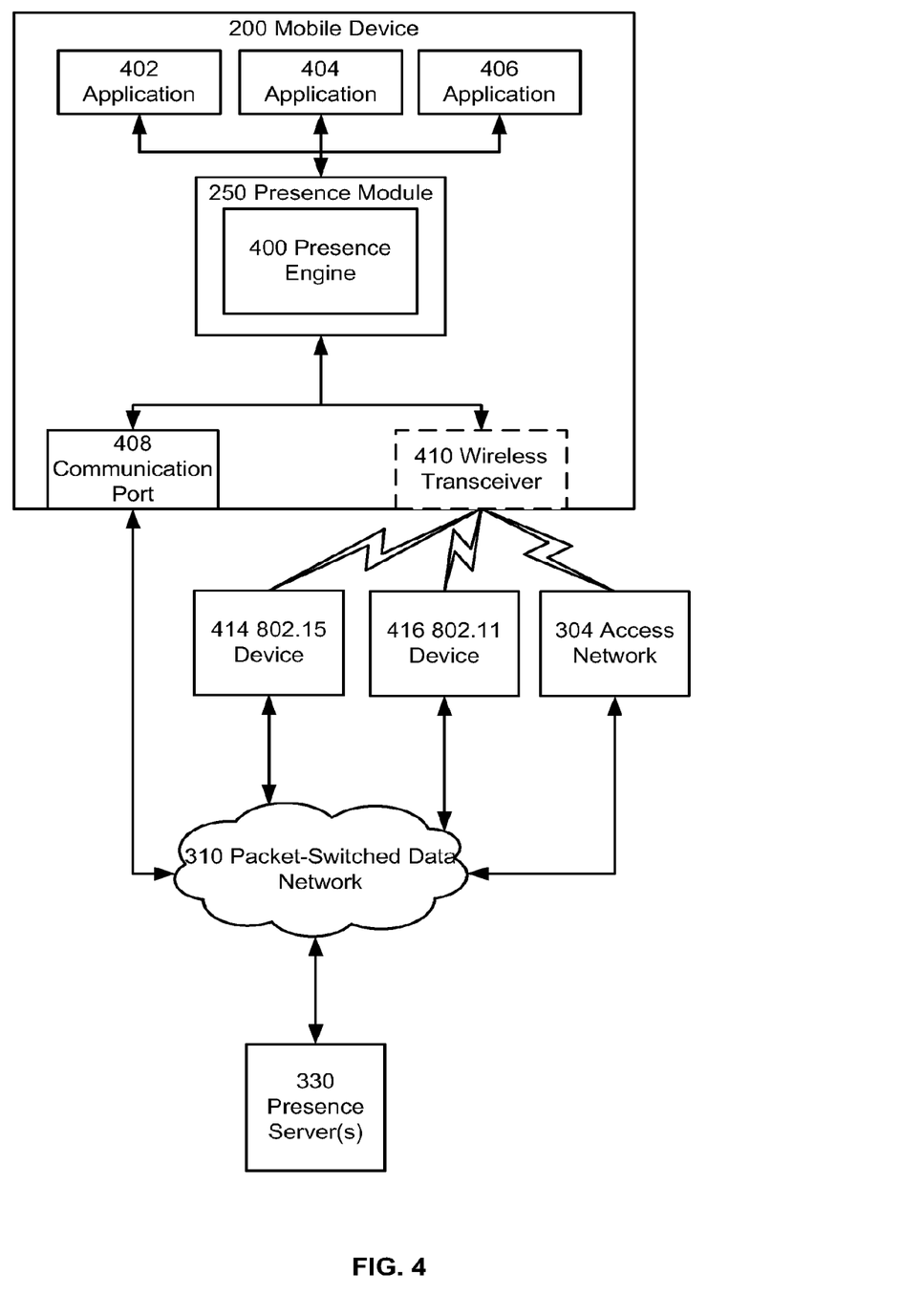
FIG. 4 depicts an exemplary mobile device.

Turning now to FIG. 4, it shows mobile device 200 including presence module 250. As illustrated by the figure, presence module 250 is shown as a single point of contact on mobile device 200 for presence requests from presence aware applications 402, 404, and 406. For example, an application program interface can be made available to presence aware applications. In an exemplary embodiment, a presence aware application can register with presence module 250 and indicate to presence module 250 what type of presence information it is interested in, e.g., location information, device state information, or application specific presence information. Presence module 250 can then configure one or more stores, e.g., memory, in a cache of memory 212 to store received presence information. In an exemplary embodiment, presence module 250 can store information that multiple applications use in a common store and store application specific information in an application specific store. For example, presence module 250 can cache location information once in a common store and store, for example, status information for buddies in an application specific store.

Presence module 250 can optimize the presence information update requests by reducing the amount of access network resources while taking application performance into account. As shown by the figure presence module 250 can use different communication channels effectuated by different access technologies to obtain presence information from presence servers 330. For example, FIG. 4 shows four different access methods that can be used to access packet-switched data network 310 through a communication port 408 or a wireless transceiver 410. Communication port 408 can be a port that connects mobile device 200 to packet-switched data network 310 either directly or via a physical bridge. For example, communication port 408 can include an Ethernet port that connects mobile device 200 to packet-switched data network 310 directly or it can be a USB port that is used to physically connect mobile device 200 to a router or computer that is directly or indirectly connected to packet-switched data network 310.

As shown by the figure, wireless transceiver 410 is indicated in dashed lines which indicate that it can be a single component or multiple components that implement multiple wireless technologies. For example, in an embodiment wireless transceiver 410 can communicate with a device 414 via a communication channel that conforms to the 802.15 communication standard such as a Bluetooth® device. In the same or another embodiment wireless transceiver 410 can communicate with a device 416 via a communication channel that conforms to the 802.11 communication standard such as a Wi-Fi® device. In the same or another embodiment wireless transceiver 410 can communicate with access network 304 using a communication channel that conforms to the HRPD standard.

Presence engine 400 can be configured to attempt to update presence information via these other communication channels, or open traffic channels in an exemplary embodiment. Thus, in this exemplary embodiment, additional access network resources would not have to be used to update the presence information. For example, presence engine 400 can be configured to use an algorithm that uses channel performance information, values assigned by the access technology, and open channels to select a channel to update over.

For example, mobile device 200 can detect available access technologies and store a list of them in memory. Presence engine 400 can look up the access technologies, obtain preference values for them that can be assigned by an access network admin, and adjust the values based on whether a channel of that type is already open. Or put another way, a preference can be given to channels that are already open and being used to send/receive information. Presence engine 400 can then calculate, or use a lookup table to obtain, data rate information. After data rate information is quantified and associated with values presence engine 400 can then generate scores for each available communication channel and select the "best" one. Presence engine 400 can then send the request using the selected access technology.

In some exemplary embodiments presence engine 400 can be configured to determine whether to use a channel to update presence information or return cached information instead. For example, presence engine 400 can be configured to perform this operation after a channel is selected, before a channel is selected, or without selecting a channel (in this last case presence engine 400 may be configured to only use a reverse traffic channel for updates). Presence engine 400 can determine whether or not to update presence information using an algorithm that uses various information stored in memory 212 as inputs and calculates a quantification. In this exemplary embodiment, the presence engine 400 can then compare the quantification to a threshold and determine whether or not to update the presence information.

In an exemplary embodiment, presence engine 400 can be configured to determine whether to update presence information from information associated one or more timestamps associated with cached presence information. For example, in an embodiment where timestamps are used, presence engine 400 can compare the current timestamp to a timestamp associated with the requested type of presence information. Presence engine 400 can then use an algorithm that takes this information into account and generate a quantification. The quantification can then be compared to a threshold to determine whether or not the presence information should be updated.

In the same, or another exemplary embodiment, priority information associated with an application requesting the presence information can be used to generate the quantification. For example, each application can be associated with priority information that indicates the importance of the application. In a specific example, an E-911 application that sends location information to emergency personal can have a higher priority than other applications. In this exemplary embodiment, presence engine 400 can identify the requesting application and lookup a priority score for the application. Presence engine 400 can then use an algorithm that takes this information into account and generate a quantification. The quantification can then be compared to a threshold to determine whether or not the presence information should be updated.

In the same, or another exemplary embodiment, user profile information can be used to generate the quantification. For example, each mobile device can be associated with a user account that has a score based on the importance of the user. In a specific example, an emergency-personnel user can have a higher priority score than a regular user. In another specific example, a user that pays a fee for premium service can have a higher priority score than a regular user. In this exemplary embodiment, presence engine 400 can obtain the score associated with the user account and execute an algorithm that takes this information into account and generate a quantification. The quantification can then be compared to a threshold to determine whether or not the presence information should be updated.

In the same, or another exemplary embodiment, how the device is being used can be used to generate the quantification. For example, information that identifies whether a user is actively interacting with mobile device 200 can be used to affect the quantification. In this example, if mobile device 200 is being used it may be more likely that the presence information is updated in order to influence the user's experience using the mobile device 200.

In the same, or another exemplary embodiment, current access network conditions can be used to determine the quantification. For example, each access network, e.g., each base transceiver station, can measure current network conditions and send information to the mobile devices it services to indicate, for example, the load on the base transceiver, current interference levels, available bandwidth, etc. For example, the forward link channel can include a medium access control channel that has load information such the number of channels in use, the level of activity in sector, e.g., interference level, etc. This information can be mapped to a table that quantifies the possible values and the information can be used by presence engine 400 to calculate the quantification. The quantification can then be compared to a threshold to determine whether or not the presence information should be updated.

In an alternative embodiment the threshold can be set based on the current access network conditions instead of or in addition to the quantification. Similar to that described above, current network conditions can be measured and sent to the mobile devices it services to indicate, for example, the load on the base transceiver. For example, presence engine 400 can be configured to receive information that defines the load on the base transceiver station 326. This information can be mapped to a table that quantifies the possible values and the information can be used by presence engine 400 to calculate the threshold.

Continuing with the description of FIG. 4, in an embodiment of the present disclosure presence module 250 can be configured to delay, deny or immediately send presence information requests based on information such as, user settings, device settings, access network settings, device state, user profile settings, and the like. For example, a user may set settings that indicate whether or not an application can request presence information. In the same, or another embodiment where a user initiated update is received, e.g., a user pressed a refresh button, the presence module 250 can send the request without running the presence engine 400. In the same, or another embodiment, a network policy can be received that identifies whether presence information updates should be triaged. For example, a base transceiver station could broadcast information that can be used to configure the presence module 250 to disable the presence engine 400 in a zone that has a light load.

The following are a series of flowcharts depicting operational procedures. Those having skill in the art can appreciate that the style of presentation utilized herein, e.g., beginning with a presentation of a flowcharts) presenting an overall view and thereafter providing additions to and/or further details in subsequent flowcharts, generally allows for a rapid and easy understanding of the various operational procedures. Furthermore, those of skill in the art that certain operations can be executed in a different order than described herein, thus, the disclosure is not limited to any specific order of operations.

Figure 5:
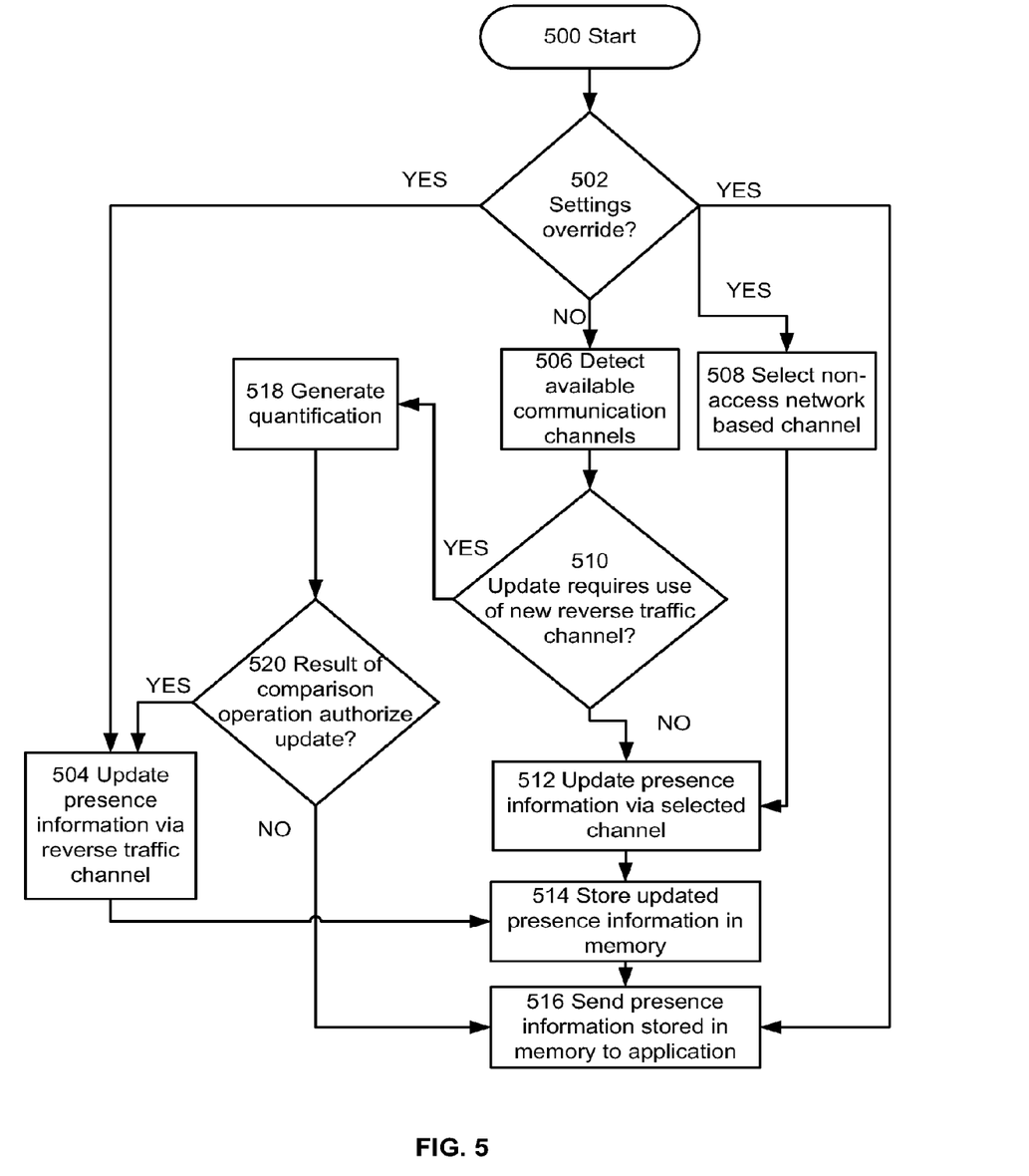
FIG. 5 depicts an operational procedure for practicing aspects of the present disclosure.

Turning now to FIG. 5, an exemplary operational procedure for practicing aspects of the present disclosure is shown. Operation 500 begins the operational procedure when, for example, an application such as a map application accesses an API and requests preference information, e.g., location information for the mobile device 200. For example, the application could request presence information in response to receiving a request from a user, or the application could be configured to periodically request presence information. Alternatively, operation 500 could begin in response to a delay operation. For example, presence module 250 may have received a request, measured access network information, and determined to wait for network conditions to become more favorable before requesting data. Thus, the request could be cached and presence module 250 could run the operational procedure of FIG. 5 after a predetermined amount of time.

Continuing with the description, at decision 502, presence module 250 can be configured to determine if features of the presence module have been enabled. In one embodiment, if a reverse traffic channel is permitted to send presence information, then the method will proceed to step 504 to update the presence information via reverse traffic channel and then store the updated presence information in memory, as shown at step 514, and then the presence information will be sent to the calling resident application, as shown at step 516.

Alternately, a settings override can be set to send the presence information only on non-access network based channels, and the process will proceed to step 508. Then the non-access network based channel will be selected and the presence information will be updated via that channel, as shown by step 512. The updated presence information will then be stored in memory, as shown at step 514, and then the presence information will be sent to the calling resident application, as shown at step 516.

In another embodiment, if settings do not support the immediate requesting of presence information through the use of a channel, then the presence information can be sent from memory to the requesting resident application, as shown at step 516. Otherwise, if no specific settings override exists at decision 502, then the presence module 250 can detect all available communication channels to send the presence information, as shown at step 506. Other settings for communication channel transmission can likewise be set for the presence module 250 as needed.

To originally obtain any settings information, presence module 250 can access a data structure in memory that can store information indicative of specific device settings, e.g., network and/or user profile settings. In an embodiment, this information can be used to configure presence information updates. For example, the data structure could store information that configures presence module 250 to enable/disable updates via access network 304. In another example, the data structure could store information that configures presence module 250 to disable access network updates and presence module 250 can be configured to select a non-access network communication channel to update presence information (if one is present), as is shown at step 508. In another exemplary embodiment, the data structure in memory can store network settings or user profile settings which can indicate that the user's account does or does not authorize the user to automatically obtain a data channel to receive presence information updates. In this example, the user would have to instead have his or her request processed by presence engine 400.

As shown by FIG. 3, if overrides authorize direct presence information updates then presence module 250 can send one or more packets of information indicative of the presence information update on a reverse traffic channel to base station transceiver 326. With reference to FIG. 3, the request can be routed to the PDSN 308 and one or more TCP/IP packets can be routed to the presence server that stores the requested presence information. For example, the request could be for the online/offline status of friends in a contacts list. The updated presence information (online/offline status) can be routed back to mobile device 200 and stored in presence information cache in memory 212 as shown by operation 514. Operation 516 shows that presence module 250 can be configured to return presence information stored in cache to the requesting application. In this example, the returned presence information would include the updated online/offline status of friends in contact list.

As illustrated by FIG. 5, if an override configures presence module 250 to provide cached information then, as illustrated by the path directly to operation 516, presence module 250 can return presence information stored in memory 212 to the requesting application. Continuing with the example, from above, since the online/offline status of friends was not updated then the information may not reflect the current situation.

As illustrated by operation 506, in an embodiment of the present disclosure presence engine 400 can detect the available communications channels. For example, presence engine 400 can survey a site and identify available wireless networks, Bluetooth devices, HRPD channels, etc. Based on the site survey presence engine 400 can determine (at operation 510) whether or not a new reverse traffic channel will need to be opened with base transceiver station 326 in order to service the request. For example, the site survey may indicate that no other channels are available, or presence engine 400 may determine that the best communication channel is provided by access network 304. Turning to operation 512, if a new reverse traffic channel is not needed the update request can be sent via a selected communication channel, e.g., if a reverse channel is opened the request can be sent via that channel, or if a 802.11 channel is available it can be sent via that channel, etc.

Turning to operation 518, in an embodiment where a new reverse traffic channel is selected at decision 510, presence engine 400 can determine whether to return cached information, or use access network 304 to obtain updated presence information. Turning to operation 518, a quantification can be determined from various information, e.g., network conditions, timestamps, etc., and the quantification can be compared to a threshold. Presence engine 400 can either update presence information (operation 504) or returned cached information (operation 516) based on the comparison (operation 520).

Figure 6:
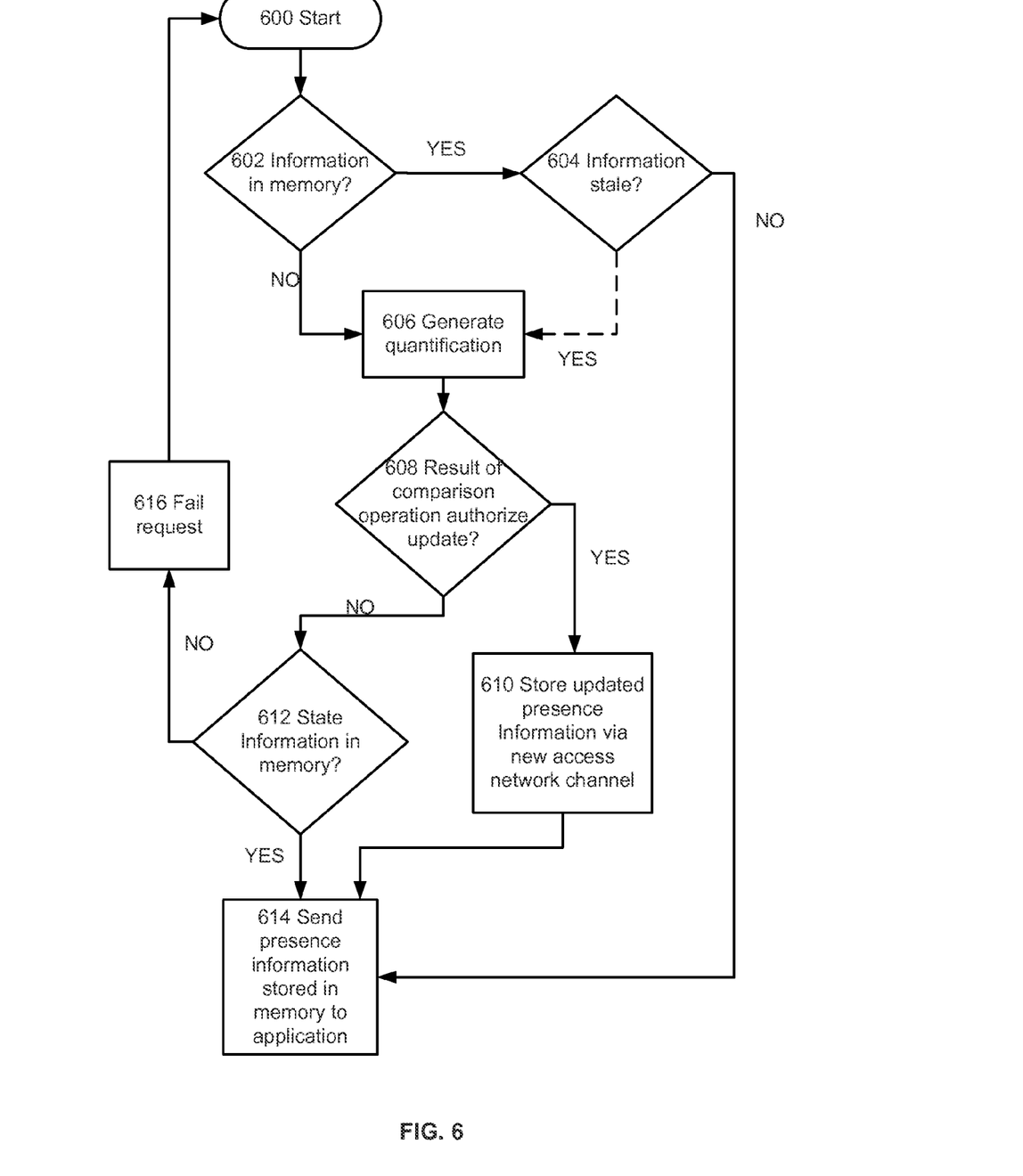
FIG. 6 depicts an operational procedure for practicing aspects of the present disclosure.

Turning now to FIG. 6 there is shown an operational procedure for practicing aspects of the present disclosure. FIG. 6 illustrates an embodiment where presence module 250 is configured to check to see if requested presence information is old before determining whether to update the information. Operation 600 begins when presence module 250 receives a request from an application for presence information, e.g., location information. Presence module 250 can run and determine what information the application is requesting and presence information cache for the presence information. In this exemplary embodiment, multiple applications may use the requested presence information and the presence module 250 may have previously obtained the information within a short period of time. Thus, as illustrated by operation 602, presence module 250 can be configured to check to determine whether it has the desired information before determining whether to update the information.

As shown by operation 604, if presence module 250 detects the desired presence information it can determine whether the information has been stored in cache for a length of time greater than a predetermined threshold. Predetermined threshold could be a value that is set in accordance with, access network information, a user profile, and/or the priority associated with the requesting application. For example, a user profile that indicates that the user is a priority user could have an associated threshold that is lower than a regular user. Similarly, when access network 304 is stressed a message can be sent to mobile device 200 setting the threshold to a larger value.

Continuing with the description of operation 604, presence module 250 can execute and compare a timestamp for the presence information to the current time and calculate a difference. Presence module 250 can then compare the difference to the threshold and determine whether the presence information is stale. As shown by the figure, if the information is stale presence engine 400 can run otherwise presence module 250 can return the cached presence information to the application as shown by operation 614. Similar to that described above, when presence information is stale presence engine 400 can execute and generate a quantification (operation 606). The quantification can be compared to a threshold and a determination (at 608) can be made as to whether access network resources should be used to update the presence information. In an alternative embodiment instead of generating quantification at operation 606 presence engine 400 can execute the portion of the operational procedure of FIG. 5 that detects available communication channels and determines whether a new reverse traffic channel needs to be opened. The operational procedure could then branch back to operation 606.

Operation 610 shows that presence module 250 can determine to update the presence information by determining which server to send a request to from, for example, information that registers a networked location for the desired presence information, and sending a request on a reverse traffic channel to base transceiver station of FIG. 3. Updated presence information can be received and sent to the application (at 614). In the instance that presence engine 400 determines not to update the information, and state information is not in memory (operation 612="No"), the request can fail (at 616). For example, a message can be displayed to the user indicating that presence information could not be obtained at this time, presence module 250 can run through the algorithm again after a predetermined amount of time expires, or the presence module 250 can attempt to obtain the presence information via a different communication channel, e.g., Bluetooth®, Wi-Fi®, etc., similar to that described above with respect to FIG. 5. Continuing with the description, if old presence information is available (operation 612="Yes") it can be sent to the application (operation 614). In an alternative embodiment a message can be displayed indicating that the information is old. In the same or an alternative embodiment instead of returning stale presence information, presence module 250 can attempt to obtain the presence information via a different communication channel similar to that described above with respect to FIG. 5.

Figure 7:
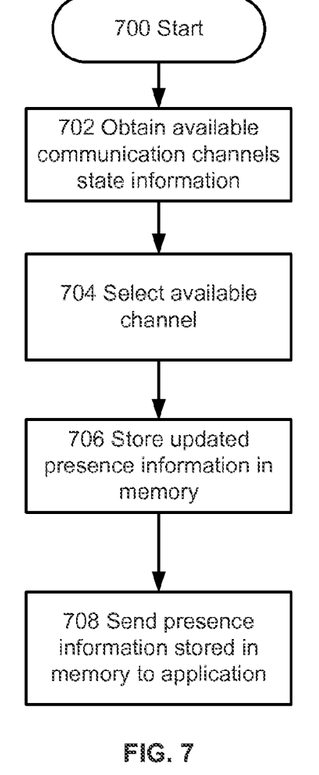
FIG. 7 depicts an operational procedure for practicing aspects of the present disclosure.

Turning to FIG. 7, it illustrates an operational procedure for practicing aspects of the present disclosure. FIG. 7 illustrates an embodiment where presence module 250 has determined to select a communication channel from a group and send the request via that channel. For example, presence module 250 can be configured to execute some, or all of the operations illustrated in FIG. 7 in response to receiving a request for presence information from an application, or after some, or all of the operations illustrated in FIGS. 5, 6, and/or 8 are executed.

Operation 700 begins the operational procedure when for example, an application requests presence information, e.g., status information for contacts in an address book application. For example, a user could open a push to talk application and the application could request status information, e.g., information which indicates whether a remote user is "busy," "available," etc., for the users in the address book. In response to the request, and as illustrated by operation 702, status information for available communication channels can be obtained. For example, presence engine 400 can access a data structure in memory that identifies the different available communication channels. Once the data structure is accessed a score can be computed for each available communication channel using an algorithm that factors in at least a preference rating.

A channel can be selected (operation 704) and a request for updated presence information can be sent to a server. Continuing with the push-to-talk example, the push-to-talk application could have previously registered with presence module 250 and could identify the type of information it uses and a networked server that stores the information. In this example, presence module 250 can send a request (in the format used to make such requests, i.e., a request that conforms to the protocol used by the presence server) to the presence server via the selected channel and store the updated presence information, e.g., status information for push-to-talk contacts (operation 706). Operation 708 then shows that the updated presence information can be sent to the requesting application.

Figure 8:
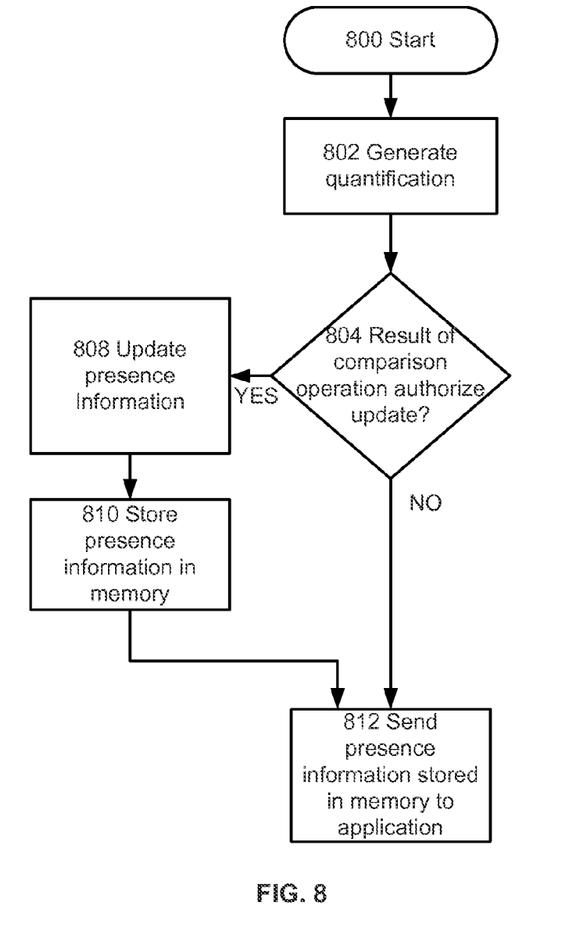
FIG. 8 depicts an operational procedure for practicing aspects of the present disclosure.

Turning to FIG. 8, it illustrates an operational procedure for practicing aspects of the present disclosure. FIG. 8 illustrates an embodiment where presence module 250 determines whether to update presence information or return cached information. For example, presence module 250 can be configured to execute some, or all of the operations illustrated in FIG. 8 in response to receiving a request for presence information from an application, or after some, or all of the operations illustrated in FIGS. 5, 6, and/or 7 are executed.

Operation 800 begins the procedure when, for example, presence module 250 runs presence engine 400 to update presence information or return cached information. In the illustrated operational flowchart, operation 802 illustrates that presence engine 400 can execute and generate a quantification. For example, the quantification could be calculated from an algorithm using load information from base transceiver station 326 and timestamp information. In an exemplary embodiment, the quantification could be generated from an algorithm that takes a value that represents an amount of time presence information has been stored in memory and subtracts it from a value that quantifies the load on the base transceiver station. Operation 804 shows that the quantification can be compared to a threshold and operations 808 and 810 show that presence engine 400 can update presence information, e.g., receive fresh presence information and store it (i.e., operation 604="Yes"). Operation 812 sends that cached information to the application based on the result of the comparison operation (i.e., operation 604="No"). Continuing with the specific example above, the threshold could be set to zero. If the calculated quantification is negative, e.g., load is great and length of time presence information is cached is short, presence engine 400 can be configured to return cached information. If the calculated quantification is positive then presence engine 400 can be configured to send the request.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A method for updating presence information on a mobile device, comprising:
   calculating an update quantification based at least on one of a network setting, priority information associated with an application requesting presence information, a timestamp of presence information stored in a memory of the mobile device, a user priority, how the mobile device is being used, an access policy for an access network, information identifying bandwidth of a wireless channel, a time period between subsequent requests for presence information, and load information for a base transceiver station;
   comparing the update quantification to a threshold value;
   determining whether presence information for a second mobile device stored in the memory requires updating based at least in part on the comparison of the update quantification to the threshold value;
   selecting one channel from a plurality of available communication channels in response to determining that the presence information for the second mobile device stored in the memory requires updating, wherein each communication channel of the plurality of available communication channels is associated with a different communication protocol; and updating the presence information for the second mobile device stored in the memory of the mobile device via the selected one channel.

2. A mobile device, comprising:
a memory;
a processor coupled to the memory, wherein the processor is configured with processor-executable instructions to perform operations comprising:
calculating an update quantification based at least on one of a network setting, priority information associated with an application requesting presence information, a timestamp of presence information stored in the memory, a user priority, how the mobile device is being used, an access policy for an access network, information identifying bandwidth of a wireless channel, a time period between subsequent requests for presence information, and load information for a base transceiver station;
comparing the update quantification to a threshold value;
determining whether presence information for a second mobile device stored in the memory requires updating based at least in part on the comparison of the update quantification to the threshold value;
selecting one channel from a plurality of available communication channels in response to determining that the presence information for the second mobile device stored in the memory requires updating, wherein each communication channel of the plurality of available communication channels is associated with a different communication protocol; and
updating the presence information for the second mobile device stored in the memory via the selected one channel.

3. A non-transitory processor-readable storage medium having stored thereon processor-executable software instructions configured to cause a processor of a mobile device to perform operations comprising:
calculating an update quantification based at least on one of a network setting, priority information associated with an application requesting presence information, a timestamp of presence information stored in a memory of the mobile device, a user priority, how the mobile device is being used, an access policy for an access network, information identifying bandwidth of a wireless channel, a time period between subsequent requests for presence information, and load information for a base transceiver station;
comparing the update quantification to a threshold value;
determining whether presence information for a second mobile device stored in the memory requires updating based at least in part on the comparison of the update quantification to the threshold value;
selecting one channel from a plurality of available communication channels in response to determining that the presence information for the second mobile device stored in the memory requires updating, wherein each communication channel of the plurality of available communication channels is associated with a different communication protocol; and
updating the presence information for the second mobile device stored in the memory of the mobile device via the selected one channel.

4. A method for updating presence information on a mobile device, comprising:
calculating an update quantification;
comparing the update quantification to a threshold value;
determining whether presence information for a second mobile device stored in a memory of the mobile device requires updating based at least in part on the comparison of the update quantification to the threshold value;
selecting one channel from a plurality of available communication channels in response to determining that the presence information for the second mobile device stored in the memory requires updating, wherein each communication channel of the plurality of available communication channels is associated with a different communication protocol; and
updating the presence information for the second mobile device stored in the memory of the mobile device via the selected one channel,
wherein selecting one channel from a plurality of available communication channels comprises:
calculating data rate information for each of the plurality of available communication channels;
generating scores for each of the plurality of available communication channels based on the data rate information; and
selecting the one channel in the plurality of available communication channels based on the generated scores.

5. A mobile device, comprising:
a memory;
a processor coupled to the memory, wherein the processor is configured with processor-executable instructions to perform operations comprising:
calculating an update quantification;
comparing the update quantification to a threshold value;
determining whether presence information for a second mobile device stored in the memory requires updating based at least in part on the comparison of the update quantification to the threshold value;
selecting one channel from a plurality of available communication channels in response to determining that the presence information for the second mobile device stored in the memory requires updating, wherein each communication channel of the plurality of available communication channels is associated with a different communication protocol; and
updating the presence information for the second mobile device stored in the memory via the selected one channel,
wherein selecting one channel from a plurality of available communication channels comprises:
calculating data rate information for each of the plurality of available communication channels;
generating scores for each of the plurality of available communication channels based on the data rate information; and
selecting the one channel in the plurality of available communication channels based on the generated scores.

6. A non-transitory processor-readable storage medium having stored thereon processor-executable software instructions configured to cause a processor of a mobile device to perform operations comprising:
calculating an update quantification;
comparing the update quantification to a threshold value;
determining whether presence information for a second mobile device stored in a memory of the mobile device requires updating based at least in part on the comparison of the update quantification to the threshold value;

selecting one channel from a plurality of available communication channels in response to determining that the presence information for the second mobile device stored in the memory requires updating, wherein each communication channel of the plurality of available communication channels is associated with a different communication protocol; and updating the presence information for the second mobile device stored in the memory of the mobile device via the selected one channel, wherein selecting one channel from a plurality of available communication channels comprises:

calculating data rate information for each of the plurality of available communication channels;

generating scores for each of the plurality of available communication channels based on the data rate information; and selecting the one channel in the plurality of available communication channels based on the generated scores.

7. A method for updating presence information on a mobile device, comprising:

calculating an update quantification;

comparing the update quantification to a threshold value;

determining whether presence information for a second mobile device stored in a memory of the mobile device requires updating based at least in part on the comparison of the update quantification to the threshold value;

returning cached presence information in response to determining that the presence information for the second mobile device stored in the memory does not require updating;

selecting one channel from a plurality of available communication channels in response to determining that the presence information for the second mobile device stored in the memory requires updating, wherein each communication channel of the plurality of available communication channels is associated with a different communication protocol; and updating the presence information for the second mobile device stored in the memory of the mobile device via the selected one channel.

8. A mobile device, comprising:

a memory;

a processor coupled to the memory, wherein the processor is configured with processor-executable instructions to perform operations comprising:

calculating an update quantification;

comparing the update quantification to a threshold value;

determining whether presence information for a second mobile device stored in the memory requires updating based at least in part on the comparison of the update quantification to the threshold value;

returning cached presence information in response to determining that the presence information for the second mobile device stored in the memory does not require updating;

selecting one channel from a plurality of available communication channels in response to determining that the presence information for the second mobile device stored in the memory requires updating, wherein each communication channel of the plurality of available communication channels is associated with a different communication protocol; and updating the presence information for the second mobile device stored in the memory via the selected one channel.

9. A non-transitory processor-readable storage medium having stored thereon processor-executable software instructions configured to cause a processor of a mobile device to perform operations comprising:

calculating an update quantification;

comparing the update quantification to a threshold value;

determining whether presence information for a second mobile device stored in a memory of the mobile device requires updating based at least in part on the comparison of the update quantification to the threshold value;

returning cached presence information in response to determining that the presence information for the second mobile device stored in the memory does not require updating;

selecting one channel from a plurality of available communication channels in response to determining that the presence information for the second mobile device stored in the memory requires updating, wherein each communication channel of the plurality of available communication channels is associated with a different communication protocol; and updating the presence information for the second mobile device stored in the memory of the mobile device via the selected one channel.

* * * * *